United States Patent
Han et al.

(10) Patent No.: US 10,243,225 B2
(45) Date of Patent: Mar. 26, 2019

(54) COOLING SYSTEM AND OPERATING METHOD OF COOLING SYSTEM

(71) Applicant: HYUNDAI MOTOR COMPANY, Seoul (KR)

(72) Inventors: Su Dong Han, Hwaseong-si (KR); Hyung Kook Kim, Seongnam-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 438 days.

(21) Appl. No.: 15/195,207

(22) Filed: Jun. 28, 2016

(65) Prior Publication Data
US 2017/0012310 A1  Jan. 12, 2017

(30) Foreign Application Priority Data
Jul. 9, 2015 (KR) .......... 10-2015-0097888

(51) Int. Cl.
*H01M 8/04746* (2016.01)
*B60L 11/18* (2006.01)
(Continued)

(52) U.S. Cl.
CPC ..... *H01M 8/04768* (2013.01); *B60L 11/1888* (2013.01); *B60L 11/1892* (2013.01); *B60L 11/1894* (2013.01); *H01M 8/04029* (2013.01); *H01M 8/04037* (2013.01); *H01M 8/04358* (2013.01); *H01M 8/04731* (2013.01);
(Continued)

(58) Field of Classification Search
CPC ......... H01M 8/04768; H01M 8/04358; H01M 8/04992; H01M 8/04731; H01M 8/04037; H01M 8/04029; H01M 2250/20; H01M 8/04074; H01M 8/04723; H01M 8/0432; H01M 8/04007; H01M 8/04014;
(Continued)

(56) References Cited

U.S. PATENT DOCUMENTS

| 3,590,960 A * | 7/1971 | Reynolds ............... F16D 65/78 |
| | | 188/264 P |
| 5,095,855 A * | 3/1992 | Fukuda .................... F01P 3/20 |
| | | 123/41.1 |

(Continued)

FOREIGN PATENT DOCUMENTS

| JP | 2004-152666 A | 5/2004 |
| KR | 10-2010-0062661 A | 6/2010 |

(Continued)

*Primary Examiner* — Orlando E Aviles Bosques
*Assistant Examiner* — Jose O Class-Quinones
(74) *Attorney, Agent, or Firm* — Morgan Lewis & Bockius LLP

(57) ABSTRACT

A cooling system of a vehicle having a fuel cell stack includes a pump for circulating a coolant in a coolant line passing through the fuel cell stack, a heater disposed on the coolant line for heating the coolant by electric power supplied by a drive motor of the vehicle, and a controller for operating the heater by a surplus electric power generated by the drive motor when a heat generation amount of the fuel cell stack is less than a first threshold value and a rotation speed of the pump is above a second threshold value, and for turning off the heater when the heat generation amount of the fuel cell stack is less than the first threshold value and the rotation speed of the pump is less than the second threshold value.

12 Claims, 7 Drawing Sheets

(51) Int. Cl.
H01M 8/04007 (2016.01)
H01M 8/04029 (2016.01)
H01M 8/04992 (2016.01)
H01M 8/0432 (2016.01)
H01M 8/04701 (2016.01)

(52) U.S. Cl.
CPC .... H01M 8/04992 (2013.01); *H01M 2250/20* (2013.01); *Y02T 90/32* (2013.01)

(58) Field of Classification Search
CPC .............. B60L 11/1892; B60L 11/1888; B60L 11/1894; Y02T 90/32; F25B 2500/04
See application file for complete search history.

(56) References Cited

U.S. PATENT DOCUMENTS

| | | | | |
|---|---|---|---|---|
| 6,383,672 B1* | 5/2002 | Fujita | ................. | H01M 2/1022 165/297 |
| 6,596,426 B2* | 7/2003 | Yang | ................. | H01M 8/04029 429/429 |
| 6,651,761 B1* | 11/2003 | Hrovat | .............. | H01M 8/04014 165/41 |
| 7,049,016 B2* | 5/2006 | Takahashi | ............. | H01M 8/023 429/429 |
| 8,691,456 B2* | 4/2014 | Choe | ................. | H01M 8/04007 429/428 |
| 8,735,011 B2* | 5/2014 | Kimata | ............. | H01M 8/04007 429/433 |
| 2001/0019789 A1* | 9/2001 | Hirakata | ........... | H01M 8/04029 429/434 |
| 2002/0094463 A1* | 7/2002 | Luken | ............... | H01M 8/04029 429/429 |
| 2002/0119352 A1* | 8/2002 | Baldauf | ................. | H01M 8/04 429/410 |
| 2002/0177022 A1* | 11/2002 | Shimonosono | ... | H01M 8/04029 429/434 |
| 2003/0031905 A1* | 2/2003 | Saito | ................. | H01M 8/04007 429/429 |
| 2003/0162063 A1* | 8/2003 | Yoshizawa | ........ | H01M 8/04007 429/413 |
| 2003/0190511 A1* | 10/2003 | Yoshizawa | ........ | H01M 8/04126 429/413 |
| 2003/0203258 A1* | 10/2003 | Yang | ................. | H01M 8/04029 429/414 |
| 2004/0229097 A1* | 11/2004 | Hirakata | ........... | H01M 8/04007 429/442 |
| 2006/0147772 A1* | 7/2006 | Takemoto | ......... | H01M 8/04007 429/429 |
| 2007/0231643 A1* | 10/2007 | Yamaga | ........... | H01M 8/04014 429/431 |
| 2007/0298296 A1* | 12/2007 | Greifenstein | ..... | H01M 8/04029 62/236 |
| 2008/0145714 A1* | 6/2008 | Kagami | ........... | H01M 8/04007 429/413 |
| 2009/0167216 A1* | 7/2009 | Soma | ........................ | B60L 7/14 318/376 |
| 2009/0269638 A1* | 10/2009 | Hobmeyr | ................ | F16K 17/04 429/513 |
| 2009/0286111 A1* | 11/2009 | Kolodziej | ......... | H01M 8/04007 429/79 |
| 2010/0183934 A1* | 7/2010 | Yukimasa | ............. | F24D 11/005 429/437 |
| 2010/0216039 A1* | 8/2010 | Jahnke | ....................... | F22B 1/18 429/413 |
| 2010/0288211 A1* | 11/2010 | Agosta | .................... | F02B 47/04 123/3 |
| 2010/0320960 A1* | 12/2010 | Hasegawa | ......... | H01M 8/04037 320/101 |
| 2011/0081588 A1* | 4/2011 | Korytnikov | ....... | H01M 8/04007 429/429 |
| 2011/0100307 A1* | 5/2011 | Moffat | ....................... | F01P 3/12 123/41.1 |
| 2011/0159393 A1* | 6/2011 | Takemoto | ........... | B60L 11/1883 429/436 |
| 2012/0122000 A1* | 5/2012 | Lee | ...................... | B60H 1/2218 429/429 |
| 2013/0295478 A1* | 11/2013 | Han | .................. | H01M 8/04925 429/428 |
| 2014/0220467 A1* | 8/2014 | Chikugo | ........... | H01M 8/04067 429/434 |
| 2014/0303838 A1* | 10/2014 | Nam | ....................... | F01P 7/048 701/36 |
| 2016/0056517 A1 | 2/2016 | Han et al. | | |

FOREIGN PATENT DOCUMENTS

| | | |
|---|---|---|
| KR | 10-2011-0006527 A | 1/2011 |
| KR | 10-2012-0053137 A | 5/2012 |
| KR | 10-2014-0076699 A | 6/2014 |
| KR | 10-2016-0024138 A | 3/2016 |

* cited by examiner

COOLING SYSTEM AND OPERATING METHOD OF COOLING SYSTEM

CROSS-REFERENCE TO RELATED APPLICATION

This application claims the benefit of priority to Korean Patent Application No. 10-2015-0097888, filed with the Korean Intellectual Property Office on Jul. 9, 2015, the entire contents of which are incorporated herein by reference.

TECHNICAL FIELD

The present disclosure relates to a cooling system and an operating method of the cooling system, and more particularly, to a cooling system and operating method for cooling a fuel cell stack of a vehicle.

BACKGROUND

A vehicle is typically provided with a cooling system in order to maintain an optimal temperature of a fuel cell stack, an inverter, a motor, an engine, and/or other electric equipment that generates heat during operation. Such a cooling system may be an air-cooled type that cools a heat source by introducing external air to the heat source, or a water-cooled type that circulates a coolant to cool the heat source. Typically the air-cooled type is inferior in cooling performance to the water-cooled type, and thus water-cooled cooling systems are widely employed for vehicles.

During operation of the cooling system for a vehicle, temperature and pressure of a coolant frequently changes according to heat generation amounts of the heat source and operating states of parts such as a pump and valves which control a flow of the coolant. When a pressure or temperature of the coolant becomes beyond, or outside of, an admissible range of a particular part, durability of the particular part may be deteriorated and decrease a lifetime of the part, thereby incurring undesirable effect such as increased friction, noise and costs. For example, when a heat generation amount of a heat source is abruptly decreased, a pressure of a coolant may be abruptly decreased. When a rotating part, such as a pump, rotates at a high speed at such a state, bubbles may be formed in the coolant by a cavitation phenomenon, thereby causing damage to the part by high speed collisions of the bubbles with surfaces of the part.

Therefore, it is desirable that a cooling system may be designed to optimally control an operating pressure of a coolant in order to improve operating lifetime and quality of the cooling system.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a cooling system and operating method thereof for a vehicle having an advantage of effectively controlling a coolant operating pressure, and thereby enhancing lifetime and noise characteristic.

An exemplary cooling system of a vehicle having a fuel cell stack may include a pump, a heater, and a controller. The pump is configured to circulate a coolant in a coolant line passing through the fuel cell stack. The heater is disposed on the coolant line and configured to heat the coolant by electric power supplied by a drive motor of the vehicle. The controller is configured to operate the heater by a surplus electric power generated by the drive motor when a heat generation amount of the fuel cell stack is less than a first threshold value and a rotation speed of the pump is above a second threshold value, and to turn off the heater when the heat generation amount of the fuel cell stack is less than the first threshold value and the rotation speed of the pump is less than the second threshold value.

An exemplary operating method of a cooling system for a vehicle having a fuel cell stack may include: acquiring a heat generation amount of the fuel cell stack and a coolant temperature in a coolant line passing through the fuel cell stack; performing a feed-forward control when the heat generation amount and the coolant temperature satisfy a predetermined feed-forward control mode entering condition, the feed-forward control being a mode in which a rotation speed of a pump circulating a coolant through the coolant line is controlled according to the heat generation amount and ambient temperature; stopping the feed-forward control when the heat generation amount or the coolant temperature satisfies a predetermined feed-forward control mode release condition during the feed-forward control; operating a heater by a surplus electric power generated by a drive motor of the vehicle when the heat generation amount is below a first threshold value and the rotation speed is above a second threshold value; and turning off the heater when the heat generation amount is below the first threshold value and the rotation speed is below the second threshold value.

Such exemplary embodiments of the present disclosure may prevent cavitation phenomenon that may occur when the coolant operating pressure abruptly decreases as the heat generation amount of a fuel cell stack abruptly decreases.

DETAILED DESCRIPTION

Figure 1:
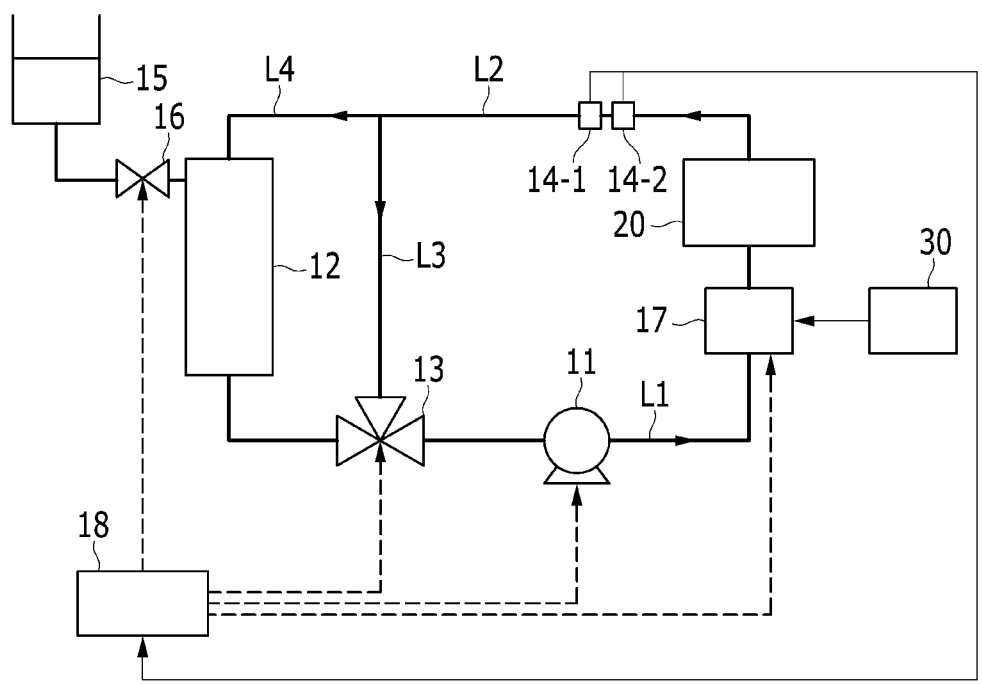
FIG. 1 is a schematic diagram of a cooling system according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, a cooling system and operating method of the cooling system according to exemplary embodiments of the present disclosure will be described in detail with reference to drawings.

Figure 2:
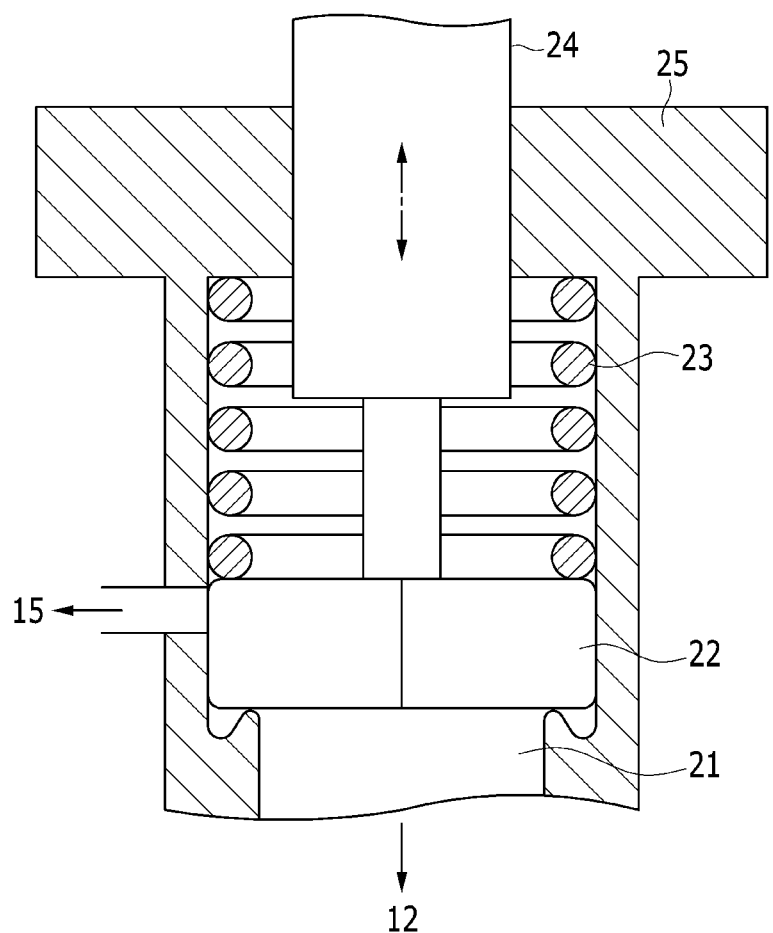
FIG. 2 is a schematic cross-sectional view of a pressurizer according to an embodiment of the present disclosure.

FIG. 1 is a schematic diagram of a cooling system according to an exemplary embodiment of the present disclosure. In addition, FIG. 2 is a schematic cross-sectional view of a pressurizer.

Referring to FIG. 1, a cooling system according to exemplary embodiments of the present disclosure may include a pump 11, a radiator 12, a 3-way valve 13, a temperature sensor 14-1, a pressure sensor 14-2, a coolant reservoir 15, a pressurizer 16, a heater 17 and a controller 18. The components illustrated in FIG. 1 are not necessarily essential to the embodiment of a cooling system, and the cooling system described in the present specification may include a larger or smaller number of components than those described above The pump 11 may pump and circulate a coolant through coolant lines. The pump 11 may be located on a first coolant line L1 that supplies the coolant to a fuel cell stack 20. The coolant inflowing into the first coolant line L1 may be supplied to the fuel cell stack 20 by pumping of the pump 11.

The fuel cell stack 20 is an electricity-generating assembly including a plurality of fuel cells that may be consecutively arranged. The fuel cell stack 20 may generate an electrical energy by an electrochemical reaction of a fuel and an oxidizing agent supplied to the fuel cells. Heat is generated while electrical energy is generated, and thus the fuel cell stack 20 is provided with a cooling system that circulates a coolant to cool the system.

The coolant supplied to the fuel cell stack 20 through the first coolant line L1 may cool the fuel cell stack 20 while passing through the fuel cell stack 20 by absorbing heat generated at the fuel cell stack 20.

The coolant passed through the fuel cell stack 20 may be exhausted through a second coolant line L2. The second coolant line L2 may be connected with third and fourth coolant lines L3 and L4. That is, the second coolant line L2 may be bifurcated into the third coolant line L3 and the fourth coolant line L4.

The third coolant line L3 may be a coolant line for circulating the coolant by bypassing the radiator 12. The coolant flowing through third coolant line L3 may be forwarded to the 3-way valve 13 by bypassing the radiator 12.

The fourth coolant line L4 may be a coolant line for supplying the coolant from the fuel cell stack 20 to the radiator 12.

The radiator 12 may be installed on the fourth coolant line L4, and cool the coolant by an air-flow. The coolant flowing through the fourth coolant line L4 may be forwarded to the 3-way valve 13 after being cooled at the radiator 12.

The 3-way valve 13 may be opened or closed by a control of the controller 18 depending on a coolant temperature, and control a flow direction of the coolant, i.e., if the coolant passes through or bypasses the radiator 12.

When the coolant is heated above a predetermined temperature, the 3-way valve 13 may interconnect the first coolant line L1 and the fourth coolant line L4. In this case, the coolant outflowing from the fuel cell stack 20 through the second coolant line L2 may flow to the fourth coolant line L4. The coolant flowing through the fourth coolant line L4 may be cooled by the radiator 12 on the fourth coolant line L4, and then recirculated to the first coolant line L1 by the 3-way valve 13.

When the temperature of the coolant is lower than the predetermined temperature, the 3-way valve 13 may interconnect the first coolant line L1 and the third coolant line L3. In this case, the coolant outflowing from the fuel cell stack 20 through the second coolant line L2 may flow to the third coolant line L3. The coolant flowing through the third coolant line L3 may bypass the radiator 12 according to the route of the third coolant line L3, and then may be recirculated to the first coolant line L1 by the 3-way valve 13.

The temperature sensor 14-1 may be located on the coolant lines and detect the temperature of the coolant flowing through the coolant lines.

The pressure sensor 14-2 may be located on the coolant lines and detect the pressure of the coolant flowing through the coolant lines.

FIG. 1 illustrates an exemplary layout in which the temperature sensor 14-1 and the pressure sensor 14-2 may be disposed on the second coolant line L2 so as to detect the temperature and operating pressure of the coolant exhausted from the fuel cell stack 20 through the second coolant line L2. However, it is notable that the present disclosure is not limited thereto, and the location of the temperature sensor 14-1 and/or the pressure sensor 14-2 may be varied. For example, the temperature sensor 14-1 and the pressure sensor 14-2 may be disposed on the first coolant line L1 so as to detect the temperature and operating pressure of the coolant supplied to the fuel cell stack 20 through the first coolant line L1.

The coolant reservoir 15 may store the coolant, and refill the coolant to the radiator 12. The coolant supplied from the coolant reservoir 15 to the radiator 12 may flow through the fourth coolant line L4.

The pressurizer 16 may be disposed at an upstream side of the radiator 12 that receives the coolant from the coolant reservoir 15.

The pressurizer 16 may be employed to pressurized or depressurize an operating pressure of the coolant in the coolant lines.

Referring to FIG. 2, a pressurizer 16 according to an exemplary embodiment of the present disclosure may be in a form of a pressurizing cap, and may include a cylinder 21, a pressurizing plate 22, a pressurizing spring 23 and an actuator 24.

The cylinder 21 may be a hollow cylindrical space that is closed and sealed. The pressurizing plate 22 and the pressurizing spring 23 may be disposed inside the cylinder 21.

The pressurizing plate 22 may be installed inside the cylinder 21 so as to reciprocally operate, and may be abutted by the pressurizing spring 23. The actuator 24 may be fixed to the housing 25 and prepared in a form of an electronic valve. The actuator 24 may be controlled by a control signal from the controller 18 (shown in FIG. 1), and control a position of the pressurizing plate 22 inside the cylinder 21. That is, according to the control signal from the controller 18, the actuator may move the pressurizing plate 22 forward or rearward (downward or upward in the drawing).

The pressurizing plate 22 may be operated by the actuator 24 and pressurize or depressurize the pressure of the cylinder 21, thereby controlling the pressure of the coolant lines. In more detail, when the actuator 24 draws the pressurizing plate 22 upward in the drawing, the pressure in the coolant lines may be decreased. When the actuator 24 pushes the pressurizing plate 22 downward in the drawing, the pressure in the coolant lines may be increased up to the force of the pressurizing spring 23. When the actuator 24 fully draws the pressurizing plate 22 upward, a route to the coolant reservoir 15 and a route to the radiator 12 may communicate with each other, and thereby the pressure in the coolant lines may become atmospheric air pressure. The pressurizing spring 23 may abut the pressurizing plate 22 and may be disposed between the pressurizing plate 22 and a housing 25.

Referring back to FIG. 1, the heater 17 applies heat to the coolant flowing through the coolant lines. The heater 17 may be connected with a drive motor 30, and receive electric power from the drive motor 30. The drive motor 30 may generate driving power of a vehicle, and may also act as a generator that generates an electrical energy, during various driving circumstances, e.g., at regenerative braking. FIG. 1 illustrates, as an example, where the heater 17 is disposed between the pump 11 and the fuel cell stack 20, and applies heat to the coolant flowing through the first coolant line L1. It should be understood that the present disclosure is not necessarily limited thereto since the location of the heater 17 on the coolant line may be varied.

The controller 18 may control an overall operation of the cooling system. It may be understood that the controller 18 may calculate a heat generation amount of the fuel cell stack 20 based on a stack current of the fuel cell stack 20. In addition, the controller 18 may acquire the coolant temperature and the coolant operating pressure in the coolant line, by the temperature sensor 14-1 and the pressure sensor 14-2 disposed on the coolant line.

The controller 18 may control heating of the heater 17 based on the heat generation amount of the fuel cell stack 20 and the rotation speed RPM of the pump 11.

The controller 18 may control pressurizing/depressurizing of the pressurizer 16 based on the coolant operating pressure of the coolant line.

The controller 18 may select a control mode of the pump 11 based on the heat generation amount of the fuel cell stack 20 and the coolant temperature, and control a rotation speed RPM of the pump 11 according to the selected control mode. For example, the controller 18 may determine one of a feed-forward control mode and a map control mode as a control mode for controlling a rotation speed RPM of the pump 11, based on the heat generation amount of the fuel cell stack 20 and the coolant temperature.

The feed-forward control mode may be a control mode that controls the rotation speed RPM of the pump 11 based on the heat generation amount of the fuel cell stack 20 and an ambient temperature, and the map control mode may be a control mode that controls the rotation speed RPM of the pump 11 based on a rotation speed map storing relationships of a desired rotation speed RPM of the pump 11 and coolant temperatures.

At a high power range of the fuel cell stack 20 due to an acceleration of the vehicle, or due to another operation of the vehicle, the cooling system may control the pump 11 in the feed-forward control mode. When the vehicle is driven in a coasting mode, i.e., driven without driver's accelerator pedal operation, the feed-forward control mode may be released. During the coasting of the vehicle, the fuel cell stack 20 outputs a minimal stack current necessary to drive accessories, and thereby the heat generation amount of the fuel cell stack 20 is abruptly decreased. When the heat generation amount of the fuel cell stack 20 is abruptly decreased, a heat source producing heat that causes coolant expansion is removed, and thereby the coolant operating pressure is abruptly decreased. When the coolant operating pressure is abruptly decreased by an abrupt decrease of the heat generation amount of the fuel cell stack 20, a negative pressure at an upstream side of the pump 11 may be caused, thereby generating a cavitation phenomenon at an upstream side of the pump 11. When the pump 11 rotates at a high speed and facilitates the cavitation phenomenon, bubbles may be formed in the coolant and such bubbles may cause damage to the pump rotating at high speeds. In addition, a boiling point of the fuel cell stack 20 may be undesirably lowered by the cavitation, and noise may be increased at rotation of the pump 11.

In such a state that the heat generation amount of the fuel cell stack 20 is abruptly decreased such as in a coasting situation after acceleration of a vehicle, an exemplary embodiment of the present disclosure prevents the cavitation phenomenon by relieving the negative pressure at an upstream side of the pump 11 and the positive pressure at an upstream side of the fuel cell stack 20.

Hereinafter, an operating method of a cooling system according to exemplary embodiments of the present disclosure is described in detail with reference to the drawings.

Figure 3:
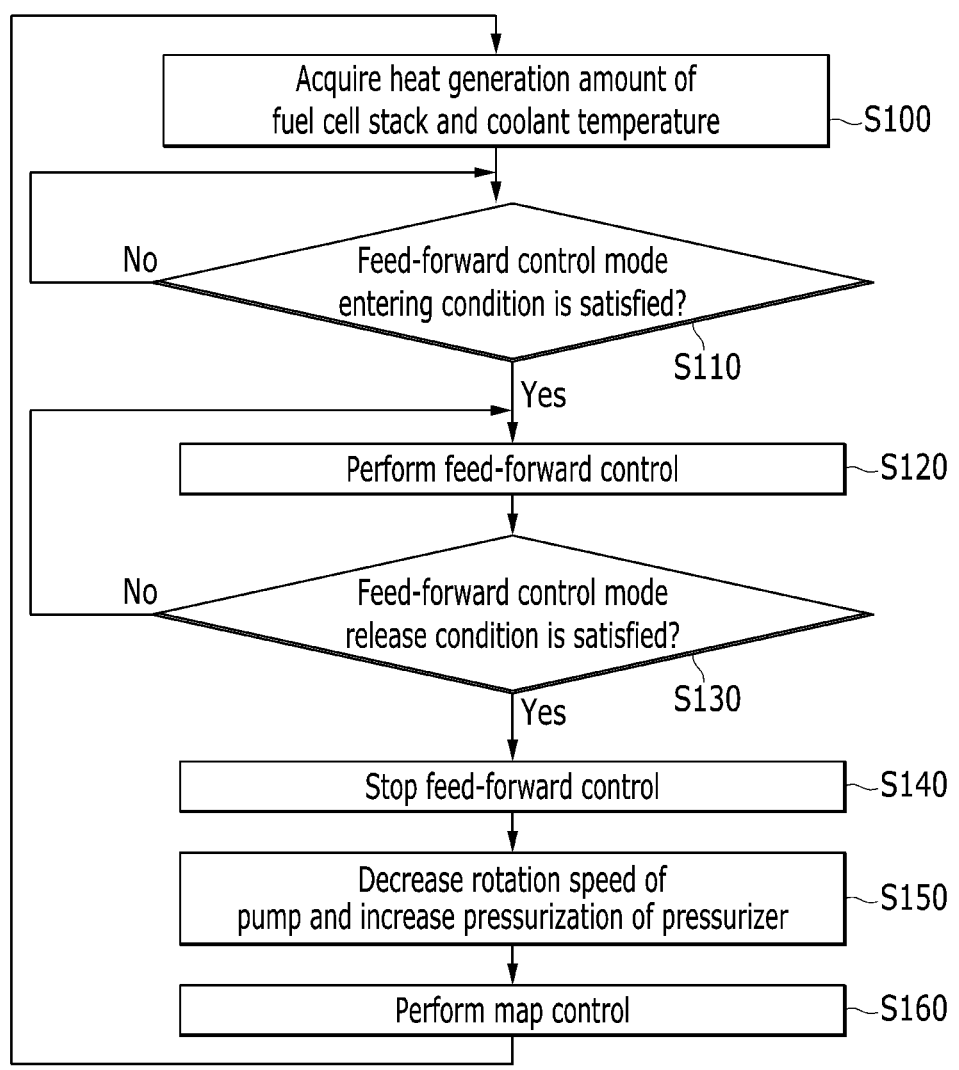
FIG. 3 is a flowchart illustrating an operating method of a cooling system according to a first exemplary embodiment of the present disclosure.
Figure 4:
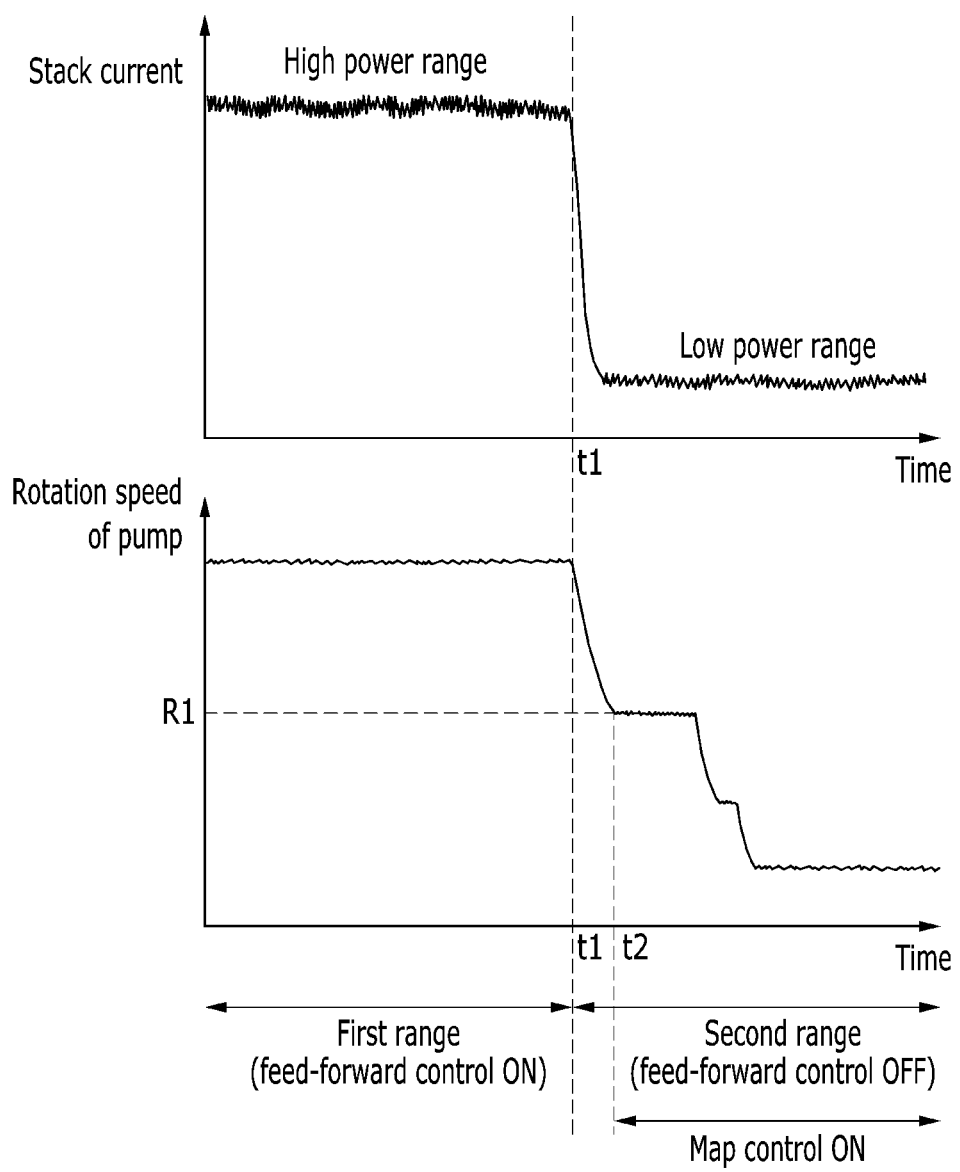
FIG. 4 illustrates an operating method of a cooling system according to a first exemplary embodiment of the present disclosure, applied to a coasting range.

FIG. 3 is a flowchart illustrating an operating method of a cooling system according to a first exemplary embodiment of the present disclosure. FIG. 4 illustrates an operating method of a cooling system according to a first exemplary embodiment of the present disclosure, applied to a coasting range.

Referring to FIG. 3, at step S100, the controller 18 may acquire the heat generation amount of the fuel cell stack 20 and the coolant temperature, in order to determine a control mode for the fuel cell stack 20.

The heat generation amount of the fuel cell stack 20 may correspond to an output current of the fuel cell stack 20. Therefore, at step S100, the controller 18 may acquire the heat generation amount by calculating the heat generation amount corresponding to a currently output current of the fuel cell stack 20 based on a heat generation amount map storing a relationship of the heat generation amount depending on the output current of the fuel cell stack 20.

At step S100, the coolant temperature may be acquired by the temperature sensor 14-1.

When the heat generation amount of the fuel cell stack 20 and the coolant temperature are acquired, the controller 18 may determine at step S110 whether the heat generation amount of the fuel cell stack 20 and the coolant temperature satisfy a feed-forward control mode entering condition.

At step S110, the controller 18 may determine that the feed-forward control mode entering condition is satisfied when the heat generation amount of the fuel cell stack 20 is above a predetermined threshold amount, and the coolant temperature is above a predetermined threshold temperature.

When the heat generation amount of the fuel cell stack 20 and the coolant temperature satisfy the feed-forward control mode entering condition at step S110, the controller 18 may enter the feed-forward control mode. By entering the feed-forward control mode, the controller 18 may perform, at step S120, a feed-forward control in which the rotation speed of the pump 11 is controlled based on the heat generation amount of the fuel cell stack 20 and an ambient temperature.

While staying in the feed-forward control mode, the controller 18 may monitor the heat generation amount of the fuel cell stack 20 and the coolant temperature, and determine, at step S130, whether the heat generation amount of the fuel cell stack 20 or the coolant temperature satisfies the feed-forward control mode release condition.

At step S130, the controller 18 may determine that a feed-forward control mode release condition is satisfied when the heat generation amount of the fuel cell stack 20 is smaller than a predetermined threshold amount, or the coolant temperature is lower than a predetermined threshold temperature.

When the heat generation amount of the fuel cell stack 20 or the coolant temperature satisfies the feed-forward control mode release condition, the controller 18 may turn off (i.e., stop) the feed-forward control at step S140. In addition, at step S150, the controller 18 may control the pump 11 to decrease the rotation speed of the pump 11 to a predetermined vale, and control the actuator 24 (shown in FIG. 2) of the pressurizer 16 to increase the coolant operating pressure by the pressurizer 16.

When the rotation speed of the pump 11 is decreased to the predetermined value by the step S150, controller 18 may enter a map control mode at step S160. In the map control mode, the controller 18 may perform a map control of the pump 11 where the rotation speed of the pump 11 is controlled based on the coolant temperature.

At step S160, the controller 18 may map-control the rotation speed of the pump 11 based on a rotation speed map storing a relationship between the rotation speed of the pump 11 and the coolant temperature. That is, the controller 18 may retrieve, from the rotation speed map, a desired rotation speed corresponding to a current coolant temperature, and control the rotation speed of the pump 11 to the desired rotation speed.

At step S160, the rotation speed map may be preset, in consideration of fuel consumption of the vehicle, such that the rotation speed of the pump 11 may not be unnecessarily high. That is, the desired rotation speed stored in the rotation speed map depending on the coolant temperature may be preset to be relatively lower than the rotation speed of the pump 11 in the feed-forward control mode. During the map control mode, the cooling system may control the 3-way valve 13 and a fan (not shown) blowing air to the radiator 12 such that cooling performance of the fan and the 3-way valve 13 may be maximized. By such a control operation, a decrease of cooling performance in the map control mode due to relatively low rotation speed of the pump 11 may be compensated, and unnecessary re-entering into the feed-forward control mode may be prevented.

Hereinafter, an operating method of a cooling system according to a first exemplary embodiment of the present disclosure is described in application to a coasting range, with reference to FIG. 4.

Referring to FIG. 4, the first range may indicate a range where the vehicle is under acceleration, and thus the stack current of the fuel cell stack 20 is maintained above a predetermined value. The cooling system may perform the feed-forward control in such a first range. Although not shown in FIG. 4, it may be understood that when a vehicle keeps acceleration, heat is continuously generated at the fuel cell stack 20, and thus the heat generation amount of the fuel cell stack 20 and the coolant temperature may satisfy the feed-forward control mode entering condition.

The second range may be a range where a driver releases the accelerator pedal to start vehicle coasting and thus the stack current of fuel cell stack 20 may be minimally maintained to a level necessary to drive accessories. In such a second range, the cooling system may turn off the feed-forward control. The release of the accelerator pedal may be detected from an operation state of accelerator pedal acquired by an accelerator pedal position sensor (not shown). When the driver's release of the accelerator pedal is detected by the accelerator pedal position sensor while the fuel cell stack 20 remains in the high power range (first range), the controller 18 may determine that a coasting driving is started, and decrease the output current of the fuel cell stack 20 to a minimal level.

As shown in FIG. 4, as the vehicle starts coasting at time t1, the stack current of the fuel cell stack 20 may be abruptly decreased, and thereby the heat generation amount of the fuel cell stack 20 may also be abruptly decreased. As a consequence, the heat generation amount of the fuel cell stack 20 may satisfy the feed-forward control mode release condition, and the controller 18 may release (or stop) the feed-forward control.

When the vehicle starts coasting and thereby the feed-forward control may be released, the cooling system may control the pump 11 such that the rotation speed of the pump 11 may be decreased to a predetermined value R1. Subsequently, when the rotation speed of the pump 11 is decreased to the predetermined value R1 at time t2, the cooling system may start map control of the pump 11, where the controller 18 may retrieve, from the rotation speed map, the desired rotation speed corresponding to a current coolant temperature, and control the rotation speed of the pump 11 according to the desired rotation speed.

As described above, according to a first exemplary embodiment of the present disclosure, the rotation speed of the pump 11 may be decreased to the predetermined value at the time of stopping the feed-forward control of the rotation speed of the pump 11. Thereby, a cavitation phenomenon caused by an abrupt decrease in output power of the fuel cell stack 20 may be prevented. That is, when the rotation speed of the pump 11 is abruptly decreased at the stopping of the feed-forward control, a positive pressure of pump 11 at an inlet-side of the fuel cell stack 20 may be decreased and a negative pressure at an upstream side of the pump 11 may be increased. Thus, the inlet-side positive pressure of the fuel cell stack 20 and the upstream negative pressure of the pump 11 may be relieved, and thereby the cavitation phenomenon caused by the abrupt decrease of the coolant operating pressure may be prevented.

According to the first exemplary embodiment of the present disclosure, when the feed-forward mode is released, the pressurizer 16 may be operated such that the pressure of pressurizer 16 is increased. By such an operation, the negative pressure at an upstream side of the pump 11 may also be relieved, since the coolant pressure at the upstream side of the pump 11 may be increased by the pressurizer 16.

Figure 5:
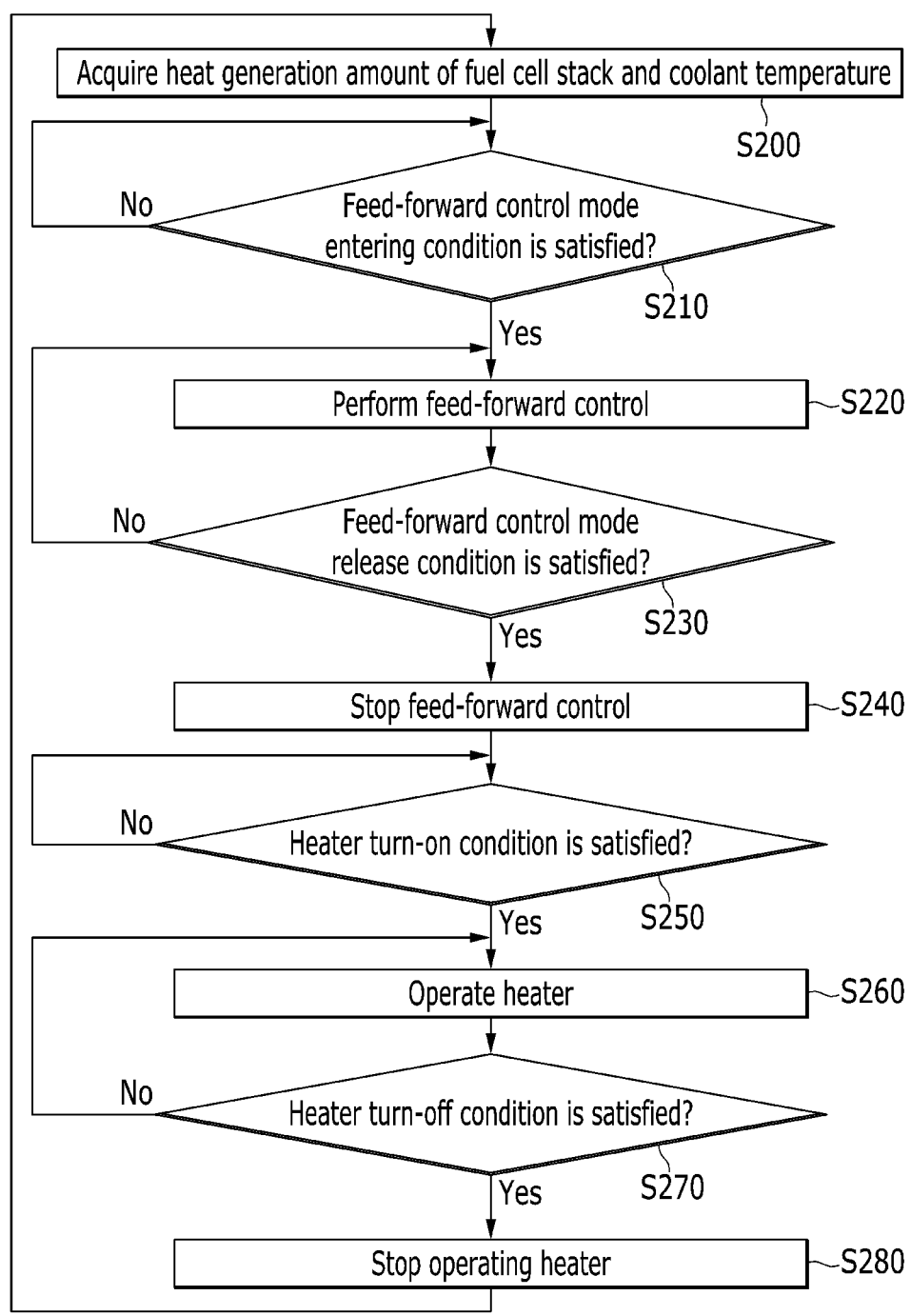
FIG. 5 is a flowchart illustrating an operating method of a cooling system according to a second exemplary embodiment of the present disclosure.
Figure 6:
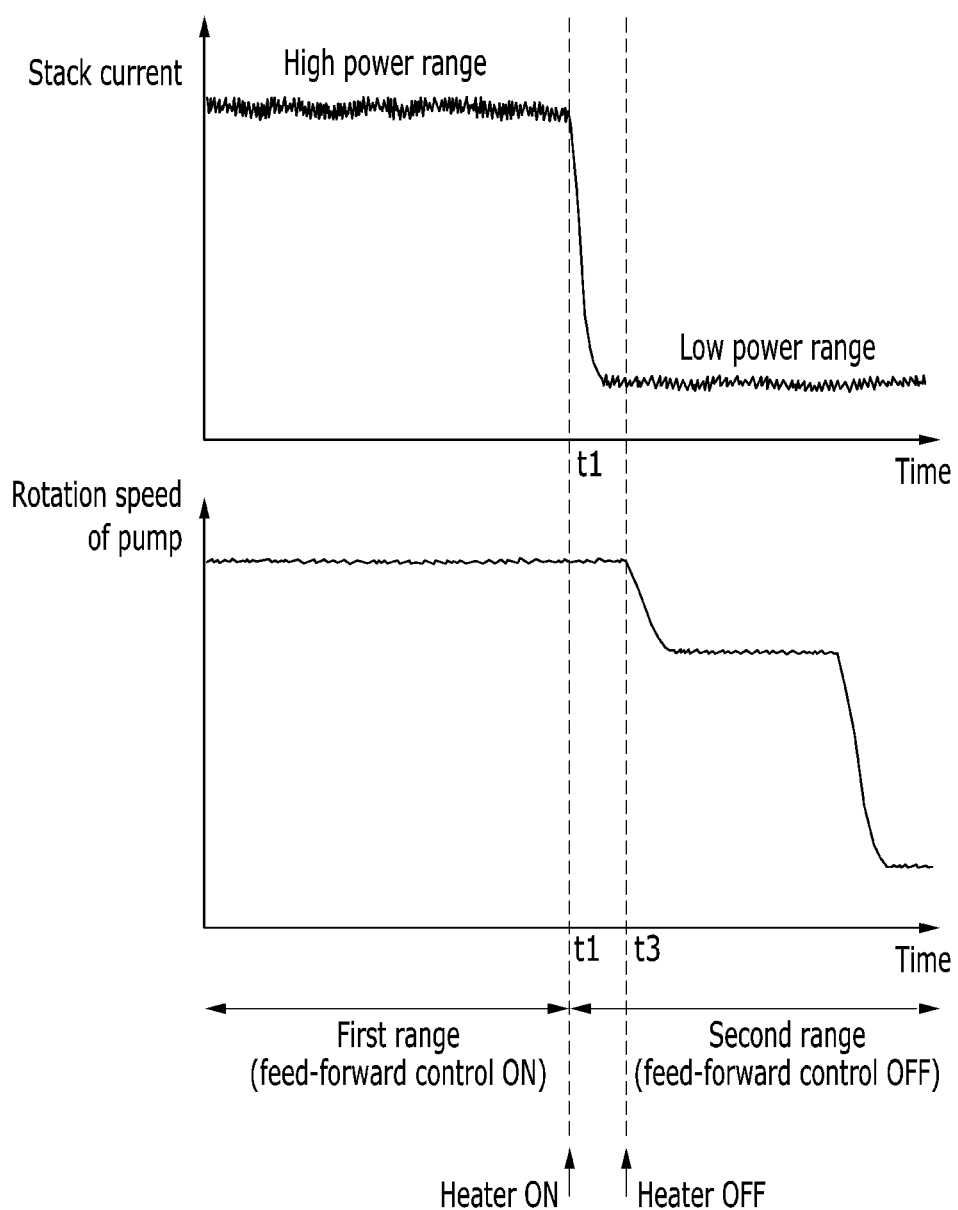
FIG. 6 illustrates an operating method of a cooling system according to a second exemplary embodiment of the present disclosure, applied to a coasting range.

FIG. 5 is a flowchart showing an operating method of a cooling system according to a second exemplary embodiment of the present disclosure. FIG. 6 illustrates an operating method of a cooling system according to a second exemplary embodiment of the present disclosure, applied to a coasting range.

Referring to FIG. 5, at step S200, the controller 18 may acquire the heat generation amount of the fuel cell stack 20 and the coolant temperature, in order to determine a control mode for the fuel cell stack 20.

At step S210, the controller 18 may determine whether the heat generation amount of the fuel cell stack 20 and the coolant temperature satisfy the feed-forward control mode entering condition S210.

At step S210, the controller 18 may determine that the feed-forward control mode entering condition is satisfied when the heat generation amount of the fuel cell stack 20 is above a predetermined threshold amount and the coolant temperature is above a predetermined threshold temperature.

When the heat generation amount of the fuel cell stack 20 and the coolant temperature satisfy the feed-forward control mode entering condition, the controller 18 may enter a feed-forward control mode at step S220. By entering the feed-forward control mode, the controller 18 may perform, at step S220, a feed-forward control in which the rotation speed of the pump 11 is controlled based on the heat generation amount of the fuel cell stack 20 and an ambient temperature.

While staying in the feed-forward control mode, the controller 18 may monitor the heat generation amount of the fuel cell stack 20 and the coolant temperature, and determine, at step S230, whether the heat generation amount of the fuel cell stack 20 or the coolant temperature satisfies the feed-forward control mode release condition.

At step S230, the controller 18 may determine that the feed-forward control mode release condition is satisfied, when the heat generation amount of the fuel cell stack 20 is smaller than a predetermined threshold amount or the coolant temperature is lower than a predetermined threshold temperature.

When the heat generation amount of the fuel cell stack 20 or the coolant temperature satisfies the feed-forward control mode release condition, the controller 18 may stop (i.e., turn off) the feed-forward control at step S240. In addition, the controller 18 may determine at step S250 whether the heat generation amount of the fuel cell stack 20 and the rotation speed of the pump 11 satisfy an operating condition of the heater 17. When the operating condition of the heater 17 is satisfied, the controller 18 may operate the heater 17 to heat the coolant at step S260.

At step S250, the controller 18 may determine that the operating condition of the heater 17 is satisfied when the heat generation amount of the fuel cell stack 20 is smaller than a predetermined threshold amount and the rotation speed of the pump 11 is above a predetermined threshold speed.

Subsequently, the controller 18 may monitor the heat generation amount of the fuel cell stack 20 and the rotation speed of the pump 11, and determine, at step S270, whether the heat generation amount of the fuel cell stack 20 and the rotation speed of the pump 11 satisfy the turn-off condition of the heater 17.

At step S270, the controller 18 may determine that the turn-off condition of the heater 17 is satisfied when the heat generation amount of the fuel cell stack 20 is smaller than a predetermined threshold amount and the rotation speed of the pump 11 is also smaller than a predetermined threshold speed.

At step S280, the controller 18 may turn off the heater 17 to stop heating of the coolant, when the heat generation amount of the fuel cell stack 20 and the rotation speed of the pump 11 satisfy the turn-off condition of the heater 17. Hereinafter, an operating method of a cooling system according to a second exemplary embodiment of the present disclosure is described in application to a coasting range, with reference to FIG. 6.

Referring to FIG. 6, the first range may indicate a range where the vehicle is under acceleration, and thus the stack current of the fuel cell stack 20 may be maintained above a predetermined value. The cooling system may perform the feed-forward control in such a first range. The second range may be a range where a driver releases the accelerator pedal to start coasting of the vehicle and thus the stack current of fuel cell stack 20 may be minimally maintained to a level necessary to drive accessories. In such a second range, the cooling system may turn off the feed-forward control.

As shown in FIG. 6, as the vehicle starts coasting at time t1, the stack current of the fuel cell stack 20 may be abruptly decreased, and thereby the heat generation amount of the fuel cell stack 20 may also be abruptly decreased. Even if the feed-forward control is released, the rotation speed of the pump 11 may be maintained to a current rotation speed at the time of stoppage of the feed-forward control, for a predetermined period up to time t3, and then may be controlled to decrease.

As described above, when the feed-forward control is turned off as the vehicle starts coasting, the rotation speed of the pump 11 may be maintained to the maximum value at a predetermined period while the stack current of the fuel cell stack 20 is decreased. Thus, the operating condition of the heater 17 may be satisfied and then the controller 18 may start an operation of the heater 17. When the rotation speed of the pump 11 is decreased at the time t3 after maintaining its maximum value for the predetermined period, the heater 17 may be turned off and heating of the coolant is stopped.

When the vehicle is coasting, heater 17 may be driven by surplus electric power of drive motor 30 at coasting, since only electric accessories act as electric load during such coasting of the vehicle while the drive motor 30 may generate enough electricity by movement of the vehicle.

When the vehicle starts coasting, a heat generation amount of the fuel cell stack 20 may be abruptly decreased. In this situation, a cavitation phenomenon may occur since coolant pressure may be decreased as a heat source is removed in the coolant line. According to the second exemplary embodiment of the present disclosure, when the vehicle starts coasting by the driver taking a foot off of the accelerator pedal, the heater 17 may be operated by using the surplus electric power of the drive motor 30 generating electricity during the coasting of the vehicle. Consequently, a negative pressure at an upstream side of the pump 11 caused by a reduction of the heat generation amount of the fuel cell stack 20 may be relieved, and thus the cavitation phenomenon may be prevented.

Figure 7:
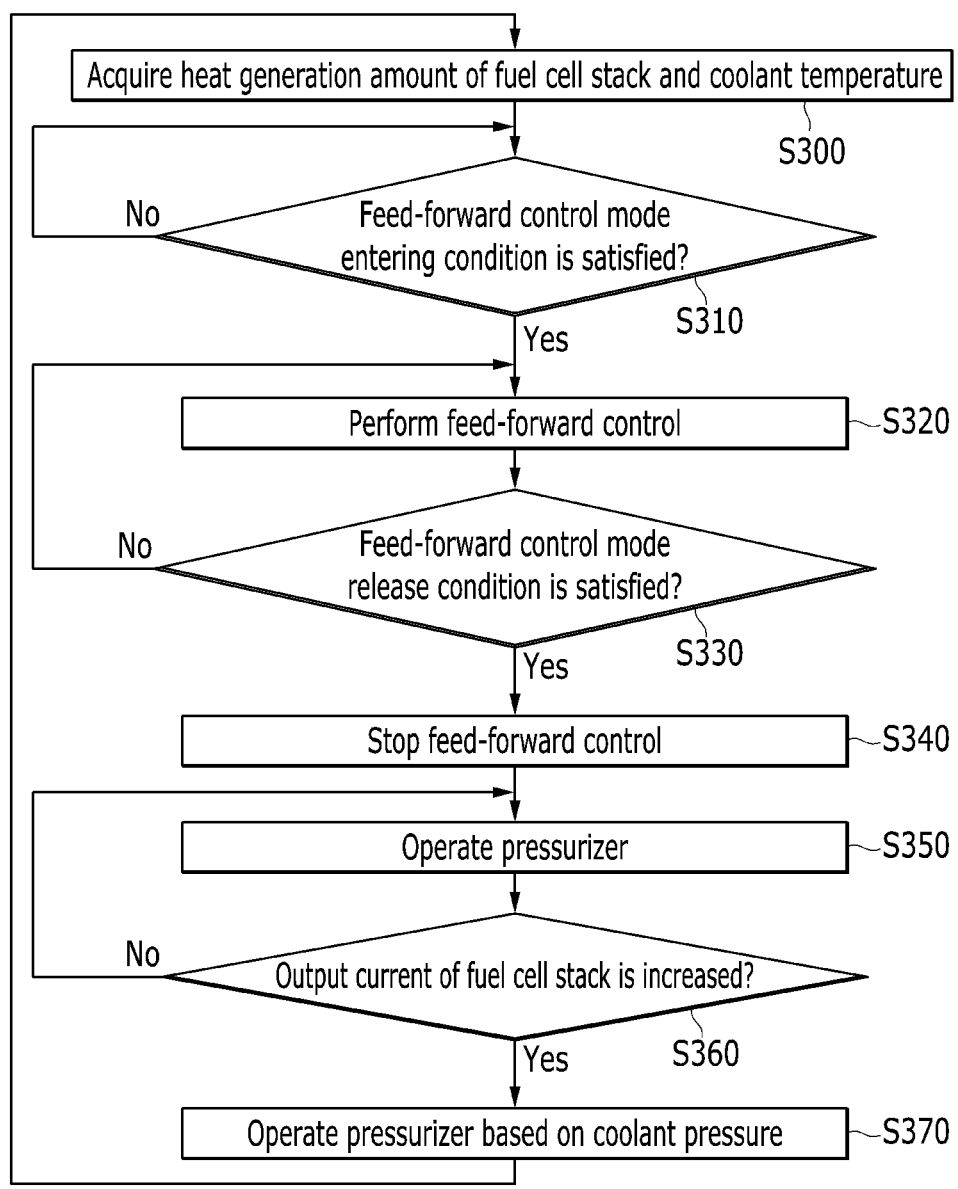
FIG. 7 is a flowchart illustrating an operating method of a cooling system according to a third exemplary embodiment of the present disclosure.

FIG. 7 is a flowchart showing an operating method of a cooling system according to a third exemplary embodiment of the present disclosure. Referring to FIG. 7, at step S300, the controller 18 may acquire the heat generation amount of the fuel cell stack 20 and the coolant temperature, in order to determine a control mode for the fuel cell stack 20.

At step S310, the controller 18 may determine whether the heat generation amount of the fuel cell stack 20 and the coolant temperature satisfy a feed-forward control mode entering condition.

At step S310, the controller 18 may determine that the feed-forward control mode entering condition is satisfied when the heat generation amount of the fuel cell stack 20 is above a predetermined threshold amount, and the coolant temperature is above a predetermined threshold temperature.

When the heat generation amount of the fuel cell stack 20 and the coolant temperature satisfy the feed-forward control mode entering condition at step S310, the controller 18 may enter the feed-forward control mode. By entering the feed-forward control mode, the controller 18 may perform, at step S320, a feed-forward control in which the rotation speed of the pump 11 is controlled based on the heat generation amount of the fuel cell stack 20 and an ambient temperature.

While staying in the feed-forward control mode, the controller 18 may monitor the heat generation amount of the fuel cell stack 20 and the coolant temperature, and determine, at step S330, whether the heat generation amount of the fuel cell stack 20 or the coolant temperature satisfies the feed-forward control mode release condition.

At step S330, the controller 18 may determine that a feed-forward control mode release condition is satisfied when the heat generation amount of the fuel cell stack 20 is smaller than a predetermined threshold amount, or when the coolant temperature is lower than a predetermined threshold temperature.

When the heat generation amount of the fuel cell stack 20 or the coolant temperature satisfies the feed-forward control mode release condition, the controller 18 may turn off (i.e., stop) the feed-forward control at step S340. In addition, at step S350, the controller 18 may operate, by controlling the actuator 24, the pressurizer 16 to apply pressure in the cooling line so as to increase the coolant operating pressure. By such an operation, the coolant operating pressure is prevented from decreasing as the heat generation amount of the fuel cell stack 20 decreases.

Subsequently, when the output current of the fuel cell stack 20 is increased at step S360, e.g., by operation of the accelerator pedal, the controller 18 may control the pressurizer 16 to a state prior to the step S350. In addition, at step S370, the controller 18 may operate the pressurizer 16 by controlling the actuator 24, based on the coolant operating pressure.

When the vehicle starts coasting, a heat generation amount of the fuel cell stack 20 may be abruptly decreased. In this situation, a cavitation phenomenon may occur since a coolant pressure is decreased as a heat source is removed from the coolant line. According to the third exemplary embodiment of the present disclosure, when the vehicle starts coasting when the driver takes a foot off of the accelerator pedal, the pressurizer 16 may be operated to apply pressure in the coolant line so as to increase the coolant operating pressure. Consequently, a negative pressure at an upstream side of the pump 11 causable by reduction of the heat generation amount of the fuel cell stack 20 may be relieved, and thus the cavitation phenomenon may be prevented.

An operating method of a cooling system according to an exemplary embodiment of the present disclosure may be executed through software. When the control method is executed by the software, constituent means of the present disclosure may be code segments that execute required operations. A program, or code segments, may be stored in a processor-readable medium or transmitted by a transmission medium or a computer data signal coupled with a carrier on a communication network.

The computer-readable recording media includes all types of recording apparatuses in which data that can be read by a computer system is stored. Examples of the computer-readable recording media include a ROM, a RAM, a CD-ROM, a magnetic tape, a floppy disk, an optical data storage unit, a non-memory semiconductor, etc. Further, the computer-readable recording media are distributed on computer systems connected through the network, and thus the computer-readable recording media may be stored and executed as a computer-readable code by a distribution scheme.

The drawings referred to and the detailed description of the present disclosure disclosed up to now are merely exemplary in the present disclosure, and they are used for describing the present disclosure and are not limit a meaning or limit the scope of the present disclosure disclosed in the claims. Accordingly, those skilled in the art may easy select and substitute therefrom. Further, a person of an ordinary skill in the art may omit a part among aforementioned constituent elements without a degradation of performance, or add an additional constituent element to improve performance thereof. Furthermore, a person of ordinary skill in the art may alter a sequence of steps described in the present specification depending on a process environment or equipment. Accordingly, the scope of the present disclosure shall not be determined by aforementioned exemplary embodiments, but shall be determined only according to the attached claims.

What is claimed is:

1. A cooling system of a vehicle having a fuel cell stack, comprising:
    a pump for circulating a coolant in a coolant line passing through the fuel cell stack;
    a heater disposed on the coolant line for heating the coolant by electric power supplied by a drive motor of the vehicle; and
    a controller for operating the heater by a surplus electric power generated by the drive motor when a heat generation amount of the fuel cell stack is less than a first threshold value and a rotation speed of the pump is above a second threshold value, and for turning off the heater when the heat generation amount of the fuel cell stack is less than the first threshold value and the rotation speed of the pump is less than the second threshold value.

2. The cooling system of claim 1, further comprising a temperature sensor disposed on the coolant line for detecting a coolant temperature of the coolant,
    wherein the controller determines, based on the heat generation amount of the fuel cell stack and the coolant temperature, whether a feed-forward control is to be performed, the feed-forward control being a mode in which the rotation speed of the pump is controlled according to the heat generation amount of the fuel cell stack and an ambient temperature.

3. The cooling system of claim 2, wherein the controller performs the feed-forward control when the heat generation amount of the fuel cell stack is above a third threshold value, and the coolant temperature is above a fourth threshold value.

4. The cooling system of claim 3, wherein the controller stops the feed-forward control when the heat generation amount of the fuel cell stack becomes lower than the third threshold value, or the coolant temperature becomes lower than the fourth threshold value, during the feed-forward control.

5. The cooling system of claim 4, wherein the controller maintains a current rotation speed of the pump for a predetermined period after stopping the feed-forward control.

6. The cooling system of claim 5, wherein the controller lowers the rotation speed of the pump to a predetermined value after the predetermined period.

7. The cooling system of claim 5, further comprising a pressurizer for pressurizing or depressurizing a coolant operating pressure of the coolant line,
    wherein, when the feed-forward control is turned off, the controller operates the pressurizer to increase the coolant operating pressure.

8. An operating method of a cooling system for a vehicle having a fuel cell stack, comprising:
- ascertaining a heat generation amount of the fuel cell stack and a coolant temperature in a coolant line passing through the fuel cell stack;
- performing a feed-forward control when the heat generation amount and the coolant temperature satisfy a predetermined feed-forward control mode entering condition, the feed-forward control being a mode in which a rotation speed of a pump circulating a coolant through the coolant line is controlled according to the heat generation amount and an ambient temperature;
- stopping the feed-forward control when the heat generation amount or the coolant temperature satisfies a predetermined feed-forward control mode release condition during the feed-forward control;
- operating a heater by a surplus electric power generated by a drive motor of the vehicle when the heat generation amount is below a first threshold value and the rotation speed is above a second threshold value; and
- turning off the heater when the heat generation amount is below the first threshold value and the rotation speed is below the second threshold value.

9. The operating method of claim 8, wherein, in the step of performing the feed-forward control, the feed-forward control is performed when the heat generation amount is above a third threshold value, and the coolant temperature is above a fourth threshold value.

10. The operating method of claim 9, wherein, in the step of stopping the feed-forward control, the feed-forward control is stopped when the heat generation amount becomes lower than the third threshold value, or the coolant temperature becomes lower than the fourth threshold value during the feed-forward control.

11. The operating method of claim 8, further comprising:
- maintaining a current rotation speed of the pump for a predetermined period after stopping the feed-forward control; and
- lowering the rotation speed of the pump to a predetermined value after the predetermined period.

12. A non-transitory recording medium having instructions which cause a controller to execute the steps of the method of claim 8.

* * * * *